United States Patent Office 3,577,398
Patented May 4, 1971

3,577,398
SYNTHETIC RESIN
Henry A. Pace and Victor J. Anhorn, Akron, Ohio, assignors to The Goodyear Tire & Rubber Company, Akron, Ohio
No Drawing. Continuation of application Ser. No. 556,293, June 9, 1966. This application Sept. 12, 1969, Ser. No. 857,598
Int. Cl. C08d 3/04
U.S. Cl. 260—85.3                                                      1 Claim

ABSTRACT OF THE DISCLOSURE

A polymeric resinous composition comprising from about 40 to about 80 weight percent units derived from piperylene and from about 60 to about 20 weight percent units derived from 2-methyl-2-butene wherein the said resinous composition has a softening point of from about 80° C. to about 110° C. The said polymeric resinous composition can be modified by having up to about 25 weight percent units derived from certain other unsaturated hydrocarbons. The polymeric resinous composition is prepared by polymerizing a mixture comprising from about 20 to about 75 weight percent of piperylene and from about 80 to about 25 weight percent of 2-methyl-2-butene in the presence of an anhydrous metal halide selected from aluminum chloride and stannic chloride.

This application is a continuation of Ser. No. 556,293, filed June 9, 1966, now abandoned.

This invention relates to new synthetic resins and to a method of preparing such resins.

Piperylene has been known to polymerize in the presence of metal halide catalysts to produce polymers which have had little or no commercial value because their physical properties have made them generally unsuitable for use in commercial applications. Also, 2-methyl-2-butene in the presence of metal halide catalysts either does not polymerize or forms low molecular weight oily products that are of limited commercial value.

It has now been unexpectedly found that a mixture of piperylene and 2-methyl-2-butene polymerizes in the presence of a metal halide catalyst to form a series of new and valuable products that are different from the polymers of piperylene or 2-methyl-2-butene prepared by such a polymerization and which are very useful in a number of commercial applications. These products are resinous materials.

Thus, it is an object of this invention to provide new and useful copolymers from piperylene and 2-methyl-2-butene. It is another object to provide a method for preparing such products. Other objects will become apparent as the description of the invention proceeds.

According to the invention a resinous material is prepared by polymerizing a mixture comprising from about 20 to about 75 weight percent of piperylene and from about 80 to about 25 weight percent of 2-methyl-2-butene in the presence of an anhydrous metal halide catalyst. It is usually desired that the mixture to be polymerized comprises from about 35 to about 65 weight percent of piperylene and from about 65 to about 35 weight percent of 2-methyl-2-butene.

The desired resinous materials prepared from the polymerizable mixture comprise from about 40 to about 80 weight percent units derived from piperylene and from about 60 to about 20 weight percent units derived from 2-methyl-2-butene. Thus, the piperylene in the mixture enters into the polymerization reaction at a faster rate than the 2-methyl-2-butene.

In practicing this invention various anhydrous metallic halide catalysts can be used. Representative examples of such catalysts are fluorides, chlorides, bromides, and iodides of metals such as aluminum, tin, and boron. Such catalysts include, for example, aluminum chloride, stannic chloride, and boron trifluoride.

In carrying out the polymerization reaction, the hydrocarbon mixture is brought into contact with the anhydrous metal halide catalyst. Generally the catalyst is used in particulate form. Generally, a particle size in the range of from about 5 to about 200 mesh size is used although larger or smaller particles can be used. The amount of catalyst used is not critical although sufficient catalyst must be used to cause a polymerization reaction to occur. The catalyst may be added to the olefinic hydrocarbon mixture or the hydrocarbon mixture may be added to the catalyst. If desired, the catalyst and mixture of hydrocarbons can be added simultaneously or intermittently to a reactor. The reaction can be conducted continuously or by batch process techniques generally known to those skilled in the art.

The reaction is conveniently carried out in the presence of a diluent because it is usually exothermic. However, with adequate mixing and cooling the temperature can be controlled and reaction conducted without a diluent being present. Various diluents which are inert in that they do not enter into the polymerization reaction may be used. Representative examples of inert diluents are aliphatic hydrocarbons such as pentane, hexane, and heptane, aromatic hydrocarbons such as toluene and benzene, and unreacted residual hydrocarbons from the reaction.

A wide range of temperatures can be used for the polymerization reaction. The polymerization can be carried out at temperatures in the range of from about −20° C. to about 100° C., although usually the reaction is carried out at a temperature in the range of from about 0° C. to about 50° C. The polymerization reaction pressure is not critical and may be atmospheric or above or below atmospheric pressure. Generally, a satisfactory polymerization can be conducted when the reaction is carried out at about autogenous pressure developed by the reactor under the operating conditions used. The time of the reaction is not generally critical and reaction times can vary from a few seconds to 12 hours or more.

The polymers can be modified by the addition of up to about 50 weight percent of piperylene dimers or piperylene trimers or other unsaturated hydrocarbons particularly hydrocarbons containing from 4 to 6 carbon atoms, and mixtures thereof to the piperylene/2-methyl-2-butene mixture. Representative examples of such hydrocarbons are butene and substituted butenes such as 2-methyl-1-butene, 2,3-dimethyl-1-butene, 2,3 - dimethyl - 2 - butene, 3,3-dimethyl-1-butene; the pentenes and substituted pentenes such as 1-pentene, 2-pentene, 2-methyl-1-pentene, 2-methyl-2-pentene, 3-methyl-2-pentene, 4-methyl-1-pentene; 4-methyl-2-pentene, the hexenes such as 2-hexene, diolefins such as isoprene, and cyclic unsaturated hydrocarbons such as cyclopentene, cyclohexene and 1,3-cyclopentadiene.

The products of this invention are characterized by having a Barrett color of from about 0.2 to about 1.0, a softening point of from about 80° C. to about 110° C. according to ASTM method E 28–58T, an acid number of from about 0.6 to about 1.5, a saponification number of from about 7 to about 25, and a specific gravity of from about .85 to about 1.0. The products can be treated, by steam stripping for example, to remove lower molecular weight compounds and thus increase its softening point to a usually more desirable range of from about 90° C. to about 110° C. These resins are generally soluble in aliphatic hydrocarbons such as pentane, hexane, and heptane and aromatic hydrocarbons such as benzene and toluene. The materials are further characterized by having a composition comprising from about 40 to about 80 weight percent units derived from piperylene, correspondingly from about 60 to about 20 weight percent units derived from 2-methyl-2-butene and when modified as herein described, can contain up to about 25 weight percent units derived from piperylene dimers, piperylene trimers and other unsaturated hydrocarbons containing from 4 to 6 carbon atoms heretofore mentioned. These prepared resinous materials are particularly useful as modifiers for natural rubber and various synthetic rubbers. Representative of such synthetic rubbers are butadiene-styrene copolymers, butadiene-acrylonitrile copolymers, and stereospecific polymers of dienes such as butadiene and isoprene. The resins are exceptionally desirable as extenders and tackifiers in such elastomeric materials and especially where resins are desired which have a light color.

The following examples further illustrate the invention and are not intended to be limiting. In these examples, parts and percentages are by weight unless otherwise indicated.

EXAMPLE 1

Into a reactor were placed 50 parts of heptane and 3.08 parts of anhydrous aluminum chloride. The mixture was cooled to about 5° C. While continuously stirring the mixture, 200 parts of a hydrocarbon mixture was slowly added to the reactor over a period of about 30 minutes. The hydrocarbon mixture had the following composition.

| Component: | Percent |
| --- | --- |
| 2-pentene | 4.8 |
| 2-methyl-2-butene | 42.2 |
| Isoprene | 2.5 |
| 1,3-pentadiene | 42.4 |
| 2,3-dimethyl-1-butene | 2.6 |
| Unsaturated hydrocarbons containing 5 to 6 carbon atoms | 5.5 |
| | 100.0 |

The temperature of the reaction was maintained in a range of about 5° to 10° C. After the hydrocarbon mixture was added, approximately 100 parts of water was added to decompose the aluminum chloride. The mixture was filtered to remove particles of decomposed aluminum chloride. The filtrate separated into an organic layer containing heptane, the polymerization product and unreacted hydrocarbons and a water layer. The water layer was drained from the filtrate. The organic layer was flash distilled by first heating it to 50° C. to remove unreacted hydrocarbons following which the pressure was reduced to 10 mm. of mercury pressure absolute and the pot temperature was increased to 290° C. The resulting residual molten resin was poured from the pot onto an aluminum tray and cooled to about 23° C. to form 121 parts of a hard brittle resin having a pale yellow color and a softening point, according to ASTM method E 28–58T of 94° C.

EXAMPLE 2

Into a reactor were placed 50 parts of heptane and 3.03 parts of anhydrous aluminum chloride. The mixture was cooled to about 5° C. While continuously stirring the mixture, 200 parts of a hydrocarbon mixture was slowly added to the reactor over a period of about 36 minutes. The hydrocarbon mixture had the following composition.

| Component: | Percent |
| --- | --- |
| 2-pentene | 9.1 |
| 2-methyl-2-butene | 38.7 |
| Isoprene | 2.2 |
| 1,3-pentadiene | 47.1 |
| Unsaturated hydrocarbons containing 5 to 6 carbon atoms | 2.9 |
| | 100.0 |

The temperature of the reaction was maintained in a range of about 5° to 10° C. After the hydrocarbon mixture was added, aproximately 100 parts of water was added to decompose the aluminum chloride. The mixture was filtered to remove particles of decomposed aluminum chloride. The filtrate separated into an organic layer containing heptane, the polymerization product and unreacted hydrocarbons and a water layer. The water layer was drained from the filtrate. The organic layer was flash distilled by first heating it to 50° C. to remove unreacted hydrocarbons following which the pressure was reduced to 10 mm. of mercury pressure absolute and the pot temperature was increased to 270° C. The resulting residual molten resin was poured from the pot onto an aluminum tray and cooled to about 23° C. to form a hard brittle resin having a pale yellow color and a softening point, according to ASTM method E 28–58T of 91° C.

EXAMPLE 3

To a reactor were charged 24.7 parts of heptane and 1.0 part of anhydrous aluminum chloride. The mixture was cooled to about 14° C. While continuously stirring the mixture, 118.9 parts of a hydrocarbon mixture was slowly added to the reactor over a period of about 3 hours and 24 minutes. The hydrocarbon mixture had the following composition.

| Component: | Percent |
| --- | --- |
| 3-methyl pentene | 1.4 |
| 2-methyl-2-butene | 22.4 |
| 2-methyl-1-pentene | 2.5 |
| 2-methyl-2-pentene | 2.1 |
| Isoprene | 2.6 |
| 1,3-pentadiene | 48.1 |
| Piperylene dimers | 16.4 |
| Other hydrocarbons containing 5 to 6 carbon atoms | 4.5 |
| | 100.0 |

The reaction was maintained in a temperature range of about 14° to 28° C. The reaction mixture was stirred for an additional hour and water was then added to decompose the aluminum chloride. The mixture separated into an organic layer containing heptane, the polymerization product and unreacted hydrocarbons, and a water layer. The water layer containing particles of decomposed aluminum chloride was drained from the reactor. The organic layer was flash distilled to a pot temperature of 50° C. followed by further flash distillation at 15 mm. of mercury pressure absolute and a pot temperature of 200° C. The residual molten residue was poured from the pot onto an aluminum tray and cooled to about 23° C. to provide 65.6 parts of a hard brittle resin. The resin had a softening point, according to ASTM method E 28–58T of 95° C., a color (Barrett) of 1, an acid number of 1.19, a saponification number of 23.7, a specific gravity of 0.942 and an ash content of 0.32%. The resin was soluble in benzene.

EXAMPLE 4

To a reactor were charged 8.0 parts of sodium bicarbonate and 4.26 parts of anhydrous aluminum chloride. The reactor temperature was adjusted to about 3° C. and 420 parts of a hydrocarbon mixture, was added slowly to the reactor over a period of 61 minutes. During the addition of the hydrocarbon the reaction mixture was continuously stirred, while being cooled in an ice bath, and the temperature of the reaction mixture increased to a maximum of 18° C. The hydrocarbon had the following composition.

| Component: | Percent |
|---|---|
| 2-pentene | 1.3 |
| 2-methyl-2-butene | 36.6 |
| 1,3-pentadiene | 42.8 |
| Isoprene | 2.2 |
| Piperylene dimers | 11.1 |
| Other unsaturated hydrocarbons containing 5 to to 6 carbon atoms | 6.0 |
| | 100.0 |

After the addition of the hydrocarbon was completed, the reaction mixture was stirred for an additional 9 minutes and the temperature of the reaction mixture continued to rise to a maximum of 32° C. To the reactor was then added 10 parts of calcium hydroxide which was immediately followed by the addition of 40 parts of water. Without removing the particles of the decomposed aluminum hydroxide, the mixture in the reactor was flash distilled to a pot temperature of 150° C. at 10 mm. mercury pressure absolute.

The distillate comprised 133.7 parts of a hydrocarbon layer and 31.6 parts of a water layer. An analysis of the hydrocarbon layer was compared to that of the hydrocarbon mixture originally added to the reactor which indicated that the prepared resin comprised the following units.

| Component: | Percent |
|---|---|
| 2-methyl-2-butene | 33.5 |
| 1,3-pentadiene | 56.2 |
| Piperylene dimers | 10.3 |

The residual molten material was poured from the pot onto an aluminum tray and cooled to about 23° C. to form 301 parts of a hard brittle residue. The residue which comprised resin and the decomposed catalyst was dissolved in 200 parts of heptane and filtered. The filtrate was flash distilled to a pot temperature of 150° C. at 8 mm. of mercury pressure absolute. The residual molten resin was poured from the pot onto an aluminum tray and cooled to about 23° C. to form 274 parts of a light colored brittle resin having a softening point according to ASTM method E 28–58T of 95° C.

While certain representative embodiments and details have been shown for the purpose of illustrating the invention, it will be apparent to those skilled in this art that various changes and modifications may be made therein without departing from the spirit or scope of the invention.

What is claimed is:

1. A polymeric resinous composition having a softening point of from about 80° C. to about 110° C. comprising from about 40 to about 80 weight percent units derived from piperylene and from about 60 to about 20 weight percent units derived from 2-methyl-2-butene and having the structure of the resin prepared by polymerizing, in the presence of anhydrous particulate aluminum chloride and a diluent at a temperature of from about 0° C. to about 50° C. a mixture comprising from about 35 to about 65 weight percent of piperylene, from about 65 to about 35 weight percent of 2-methyl-2-butene, wherein the said diluent is selected from aliphatic hydrocarbons and aromatic hydrocarbons.

References Cited
UNITED STATES PATENTS

| 2,698,841 | 1/1955 | McKay | 260—45.5 |
|---|---|---|---|
| 3,048,562 | 8/1962 | Cull et al. | 260—45.5 |

JOSEPH L. SCHOFER, Primary Examiner

R. A. GAITHER, Assistant Examiner

U.S. Cl. X.R.

260—879